June 15, 1954   M. F. GRUNWALD ET AL   2,680,925
SQUEEGEE FOR FISHING LINES AND THE LIKE
Filed July 29, 1950
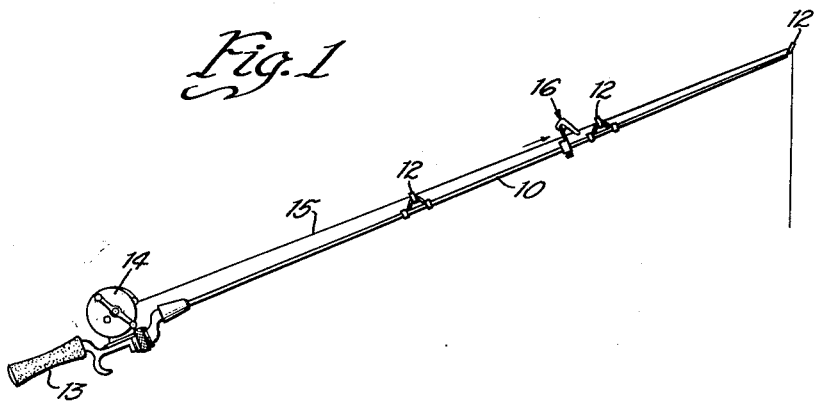
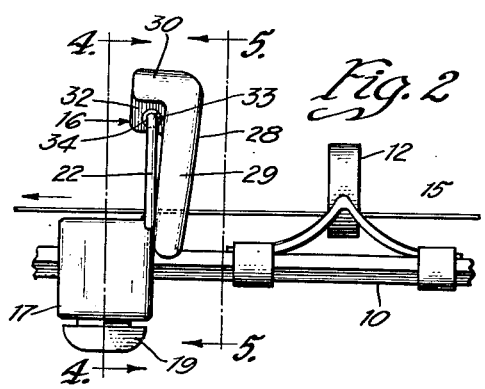
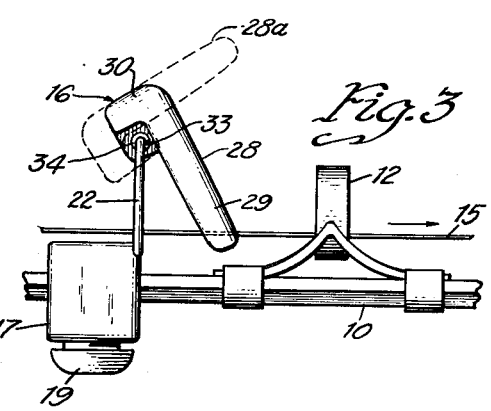
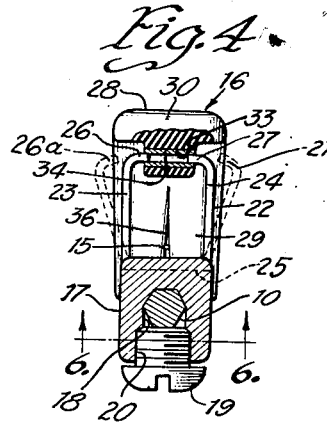
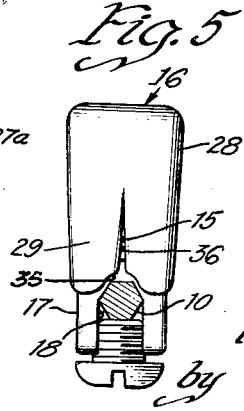
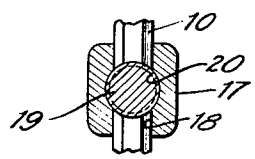
Inventors
Marshall F. Grunwald
Marshall B. Grunwald
by Albert G. McCaleb
Attorney Patented June 15, 1954

2,680,925

UNITED STATES PATENT OFFICE 2,680,925

SQUEEGEE FOR FISHING LINES AND THE LIKE

Marshall F. Grunwald and Marshall B. Grunwald, Elmhurst, Ill.

Application July 29, 1950, Serial No. 176,566

4 Claims. (Cl. 43—25)

This invention relates to squeegees for fishing lines and the like, and more particularly to squeegees adapted to function during normal use of the line to remove water therefrom.

One of the objects of our invention is to provide a squeegee constructed and arranged for attachment to a casting rod or the like to effect the removal of water from the casting line as that line is reeled in after making a cast.

Our invention has for another object the provision of a squeegee for a casting line or the like which does not interfere with the outward movement of the line when making a cast.

As another object, this invention has within its purview the provision of a squeegee for removing water from a line which moves relative thereto and in which the line wiping element is readily replaceable if and when it becomes worn or damaged.

This invention further comprehends the provision of a line squeegee adapted to attachment to a casting rod and embodying a clamp which affords secure attachment to the rod at a desired position for use, as well as ease of placement and removal.

It is another object of our invention to provide a squeegee for removing water from a line during linear movements of the line in one direction, and in which a squeegee is mounted for swinging movements in the plane of linear travel of the line.

Other objects and advantages will be apparent also from the following description of an exemplary embodiment of our invention disclosed for illustrative purposes by reference to the accompanying one sheet of drawings, in which:

Fig. 1 is a side elevational view depicting the adaptation of a preferred form of our squeegee to a conventional bait casting rod equipped with a line and a reel;

Fig. 2 is an enlarged fragmentary side view of a portion of the structure shown in Fig. 1, and showing the positions assumed by parts when the line is moved in one direction along the rod;

Fig. 3 is a view similar to Fig. 2, but showing, in solid lines, the position assumed by the parts when the line moves in a direction opposite to that of Fig. 2; the dotted lines illustrating one limit of movement of the part in one direction;

Figs. 4 and 5 are end sectional views taken respectively on lines 4—4 and 5—5 in Fig. 2, and in the directions indicated by arrows; and Fig. 6 is a bottom sectional view taken substantially on a line 6—6 of Fig. 4 and in the direction of the arrows.

In bait casting and the like, a considerable amount of fishing line is payed out in making a cast. At each cast, practically all of the line goes into the water and gets soaked. Then, when the line is reeled in the soaked line normally carries a large portion of the water past the line guides and back to the reel. In time, a fisherman has his hands and clothes wet from the accumulation of water off of the line. The squeegee of our invention removes a sufficient percentage of the water from the line to prevent it from being carried back to the reel and the fisherman; this result being accomplished without interfering with the normal casting operation of the rod and reel.

In the exemplary embodiment of our invention which is shown in the accompanying drawings for illustrative purposes, Fig. 1 depicts a casting rod 10 equipped with line guide ferrules 12 and provided with a handle 13. Near the handle, a reel 14 is removably secured in place on the rod for the storage of a quantity of casting line 15; said line extending along the rod and being threaded through the line guide ferrules. A bait or lure of any desired type (not shown) is connected to the free end of the line during use in casting. The weight of the lure is utilized along with proper casting motion of the rod to draw a considerable quantity of line from the reel when making a cast. After making such a cast, the line is retrieved by winding it back onto the reel.

Our attachment 16 is secured to the rod 10 at a position for engagement with the casting line, and preferably near the rod tip. In the disclosed illustration, the attachment is attached to the rod near the second ferrule. This provides a satisfactory position, since the action of the line is quite stable at that point, and water removed at that position will drain away at a distance from the fisherman and his boat.

While it is understood that an attachment embodying some of the same features of structure could be permanently associated with the rod, as, for example, by securement to a line guide ferrule by soldering, we have shown our structure as an ensemble adapted to attachment to conventional casting rods and the like.

Considering the disclosed attachment in greater detail, as it is illustrated in Figs. 2 to 6 inclusive of the drawings, we have provided a support that includes a base portion composed of a metal block 17 having a channel 18 extending longitudinally therethrough and opening outwardly through one side of the block. The channel 18 is of a size to fit over a casting rod of the usual size and shape, and, as may be readily appreciated, can be put in place and removed without difficulty and without damage to the rod. For removably securing the block in place on the rod, we have provided a screw 19 which is threaded into a bore 20 in the block, which bore, in the disclosed structure, is parallel to the channel sides, so that the screw forces the rod into the channel and clamps it securely in place.

Secured to and projecting from the block 17 is a generally U-shaped bale type member 22 which also forms part of the support and which is preferably made of relatively resilient metal wire. Side arms 23 and 24 of the bale type member project from the block in substantially parallel relationship and are joined by an integral connecting portion 25 which is secured to one corner of the block by soldering, brazing or the like. The plane of the side arms extends laterally of the channel in the block, and the space between the arms constitutes a line-receiving opening in the support through which the line passes in its normal path between the guide ferrules. At the ends of the side arms remote from the block 17, opposed and substantially aligned inturned end portions 26 and 27 provide bearings for movably and removably supporting a squeegee 28, the portions 26 and 27 establishing an axis on the support about which the squeegee swings.

As illustrated, the squeegee is made of a relatively soft and resilient material, such as rubber, leather or the like, which material is unharmed by water, wear resistant and has sufficient rigidity and body to maintain its shape in use.

In general, our preferred form of squeegee is L-shaped, having an elongated stem portion 29 and an angularly disposed end portion 30. At the intersection of the stem and end portions 29 and 30, is an integrally formed boss 32 which is narrower than the stem and end portions and has a lateral opening 33 therethrough. The opening 33 may, in itself receive the end portions 26 and 27 of the side arms to suspend the squeegee for swinging movement in a plane extending longitudinally of the rod. We prefer however, to provide a bearing sleeve 34 in the opening 33 to resist wear and provide ease of turning movement.

Being thus supported, the squeegee normally assumes a position with the stem portion thereof extending downwardly along the bale type support. In our disclosed structure, the widths of the stem and end portions of the squeegee are greater than that of the bale type support, so that when normally suspended, the surface of the stem portion engages the support to limit movement in one direction. As shown in dotted lines at 28a in Fig. 3, swinging movement of the squeegee in the opposite direction is limited by engagement of the end portion thereof with the bale type support, thereby to prevent the squeegee from getting on the wrong side of the support during the motion of a cast. Also, as depicted in dotted lines at 28a and 27a in Fig. 4, the end portions 26 and 27 of side arms may be withdrawn from the bearing to effect removal and replacement of the squeegee.

As shown in Figs. 2 and 5, the length of the stem portion of the squeegee is such that when it is free, it extends along the support with its free end in close proximity to the rod mounted in the channel 18 of the block. In our preferred structure, the end of the stem portion has therein a recess 35 through which one side of the rod is adapted to pass without contact. A slot or groove 36 extends longitudinally into the stem portion of the squeegee from the recess 35 to receive the line 15, whereby the squeegee wipes the water from the line as it is reeled in.

In operation, our squeegee is normally held in contact with the line by gravity. As line is payed out during a cast, the force of the line swings the squeegee outwardly away from the support, as shown in Fig. 3, so that it applies negligible restraining force to the line. When the line is reeled in, however, the leverage of the squeegee and its frictional contact with the line force the line into the groove 36, so that the water is wiped from the line.

As shown in Figs. 4 and 5, the upper or closed end of the slot 36 is closer to the pivot axis formed by the arm portions 26 and 27 than the lower end of the line-receiving opening at the base portion 17, and the lower or free end of the squeegee is farther from the pivot axis than the lower end of the line-receiving opening. Thus the slot extends across the line-receiving opening when the squeegee is against the support, so that the line can pass through the slot and the line opening in the support simultaneously. In the same position of the squeegee its lower end overlaps the base portion 17 so that the line is prevented from escaping from the slot 36 when the squeegee is drawn against the support and is squeezing the line.

Since the squeegee 28 is wider than the line opening in the support in a direction parallel to the pivot axis of the squeegee, the squeegee is prevented from entering the line opening and becoming stuck between the support legs 23 and 24. Thus the squeegee has free swinging movement at all times.

While we have illustrated a preferred embodiment of our invention, modifications of such embodiment may be made without departing from the spirit of the invention, and we do not wish to be limited to the precise details of construction set forth, but desire to avail ourselves of all changes within the scope of the appended claims.

Having thus illustrated and described a preferred embodiment of our invention, what we claim as new and desire to secure by Letters Patent of the United States is:

1. An attachment for a fishing rod for removing water from a fishing line, comprising a supporting member adapted to be secured to a fishing rod and having a side wall thereof adapted to be located in a plane at right angles to the axis of the rod, a resilient metal wire U-shaped frame rigidly secured to one end of said support so that the plane thereof is substantially in alignment with the plane of said side wall, the free ends of the frame being folded inwardly to define aligning pivots, a metal sleeve bearing mounted on said pivots, and a squeegee, L-shaped in cross section longitudinally, having the shorter leg thereof provided with an opening in which the sleeve is mounted, the longer leg of the squeegee being greater in length than the distance from the center of the opening to the closest end of the support, and adapted to overlap the side wall thereof, said longer leg having a longitudinally extending V-shaped slot in the end of the leg most remote from the opening, said slot constituting a wiping element for a line located substantially parallel to the rod, extending through the frame, and in engagement with the side walls of the slot, whereby drawing of the line in one direction will effect the movement of the squeegee in one rotational direction to engage the support as a stop, and when the line is drawn in the opposite direction the line will release itself from the slot and facilitate rotation of the squeegee in the opposite direction.

2. An attachment for a casting rod for removing water from a casting line while such line is being reeled in after a cast and comprising, in combination, a support including a base portion mountable at a fixed position relative to the casting rod and having means extending upwardly at one end of the base portion to provide a supporting pivot having an axis lateral to the rod and defining a line passage which is longitudinal to the rod and between the base portion and the pivot axis, a substantially L-shaped squeegee having angularly disposed leg portions of different lengths, and sleeve bearing means disposed in the shorter leg, said squeegee being mounted for free swinging movement with said sleeve bearing means journaled on said supporting pivot, the shorter leg portion being at the top and the longer leg portion normally gravitating to a position extending downwardly along the support and into contact with said end of the base portion, said squeegee having a slot extending therethrough at the lower end thereof and in a plane normal to the plane of the top surface of said end of the base portion, said slot extending upwardly from said lower end of the squeegee to a position such that it normally overlies the line passage so that the line extending through the line passage is normally engaged for wiping by the squeegee, whereby movements of the line in one direction through the squeegee slot and line passage urge the squeegee into contact with the support to stop movement of the squeegee, and movements of the line in the opposite direction move the squeegee rotationally away from the line so that the line is freed therefrom.

3. An attachment for a casting rod for removing water from a casting line while such line is being reeled in after a cast and comprising, in combination, a support including a base portion adapted to be secured at a fixed position relative to the casting rod and having a part extending upwardly from the base portion defining a line passage, a substantially L-shaped squeegee having angularly disposed leg portions of different lengths, and means at one side of the longer leg portion of the squeegee and at the same end thereof as the shorter squeegee leg for providing a hinge connection between the squeegee and the top of said part of the support so that the squeegee is normally free to swing within a limited range of angular movement relative to the support, the longer leg of the squeegee being normally biased by gravity to a position extending along one end of the support and into contact with the support to limit movement thereof in one direction, said longer leg of the squeegee also having a line receiving slot therein which normally overlaps said line passage in the support and through which the line may extend with the squeegee having wiping contact therewith, said squeegee being retained in wiping contact with the line by said support during movements of the line in one direction, and said squeegee being swung away from the support and out of said wiping contact with the line during movements of the line in the opposite direction.

4. An attachment for a casting rod for removing water from a casting line while such line is being reeled in after a cast and comprising, in combination, a support including a base portion adapted to be secured at a fixed position on a casting rod and having a part extending upwardly from the base portion defining a line guide, and a squeegee having angularly disposed portions of different length with means offset from the juncture of the portions providing a hinge connection to the top of said part of the support from which the squeegee is hung along one end of the support for swinging movement, the longer leg of said squeegee normally being biased by gravity to a position of contact with the said end of the support and overlying the line guide formed by said part of the support, said squeegee having a line receiving slot extending therethrough at the bottom end and extending to a position overlying the line guide in a plane longitudinal to the line and rod, said slot being of a width to receive the line with side portions of the squeegee in wiping contact therewith, said squeegee being retained in wiping contact with the line by engagement with the support when the line moves in one direction, and said squeegee being swung away from the support and line when the line moves in the opposite direction.

References Cited in the file of this patent

UNITED STATES PATENTS

| Number | Name | Date |
|---|---|---|
| 664,889 | Ogimura | Jan. 1, 1901 |
| 1,709,436 | Koester | Apr. 16, 1929 |
| 2,164,021 | Rogoff | June 27, 1939 |
| 2,203,337 | Mebold | June 4, 1940 |
| 2,474,718 | Bender | June 28, 1949 |

FOREIGN PATENTS

| Number | Country | Date |
|---|---|---|
| 980,938 | France | May 21, 1951 |